May 26, 1970     M. MARKARIAN     3,514,678

FLAT PACK CAPACITOR

Filed Dec. 24, 1968

United States Patent Office 3,514,678
Patented May 26, 1970

3,514,678
FLAT PACK CAPACITOR
Mark Markarian, Williamstown, Mass., assignor to Sprague Electric Company, North Adams, Mass., a corporation of Massachusetts
Filed Dec. 24, 1968, Ser. No. 786,710
Int. Cl. H01g 1/00
U.S. Cl. 317—261                            5 Claims

ABSTRACT OF THE DISCLOSURE

Planar electrodes having triangular end portions are arranged in a stacked unit with interposed dielectric spacers. Alternate electrodes are reversed such that the triangular portions are longitudinally extended and laterally spaced at the ends of the unit which permits direct connection to each electrode at both ends of the stacked unit.

BACKGROUND OF THE INVENTION

This invention pertains to flat pack capacitors and more particularly to flat pack capacitors having a low value of self-inductance.

For low inductance it is desirable to reduce or eliminate lead length and to provide large area connections to the electrodes. In one type of construction, these requirements are satisfied by a flat pack arrangement in which the electrodes extend from an end of the unit. However, electrodes employed in such units generally utilize costly configurations which also complicate assembly of the unit.

It is an object of this invention to provide a simple economical flat pack capacitor.

It is another object of this invention to provide an economical flat pack capacitor having electrode terminations extended from both ends of the component.

It is a further object of this invention to provide a flat pack capacitor having triangular electrode portions extended as capacitor terminals.

SUMMARY

A flat pack capacitor constructed in accordance with the invention comprises at least a pair of electrodes separated by a dielectric spacer material, each of said electrodes having a triangular shaped portion longitudinally extended from at least one end thereof, and said triangular portion formed by an edge of said electrodes being disposed at an oblique angle to the longitudinal edges thereof.

In a preferred embodiment, each electrode is rhomboidal shaped, and alternate electrodes are rotated such that triangular portions of each electrode extend from the capacitor to provide laterally spaced terminals of both polarities at both ends of the stacked unit.

DESCRIPTION OF THE PREFERRED EMBODIMENTS

Figure 1:
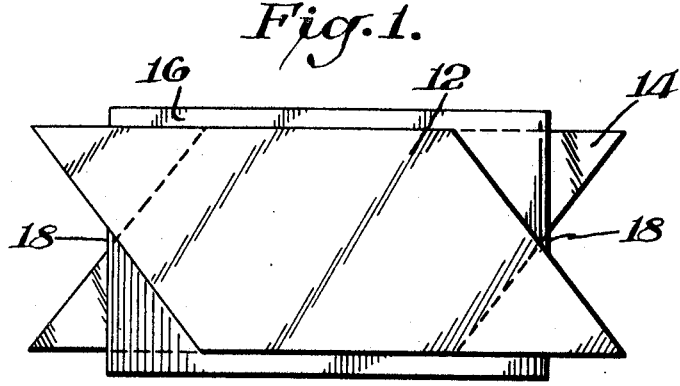
FIG. 1 is a plan view of a flat pack capacitor provided in accordance with the invention.
Figure 2:
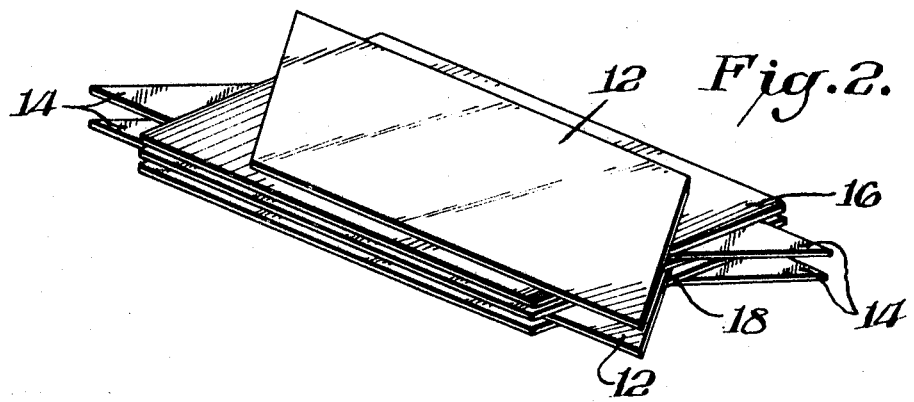
FIG. 2 is a view in perspective of the flat pack capacitor shown in FIG. 1.

As shown in FIGS. 1 and 2, rhomboid electrodes 12 and 14 are alternately disposed in a stacked arrangement with dielectric spacing material 16 interposed between the electrode layers. The electrodes are substantially identical in shape but are alternately reversed, that is, they are stacked in an alternating arrangement with every other electrode rotated 180° from the position of the interposed electrodes.

Hence electrode 12 is positioned with its lower right edge extending from one end of the stack and its upper left edge extending from the other end of the stack, whereas electrode 14 is rotated through 180° with respect to electrode 12 such that its upper right hand edge extends from the one end and its lower left hand edge extends from the other end of the stack.

This construction provides triangular portions longitudinally extended from both ends of the stack with portions of similar polarity overlying each other at one end, and laterally spaced from portions of opposite polarity at that end. As illustrated, portions of similar polarity are extended from alternate corners of the unit, while anode and cathode tab portions of large areas are provided at both ends.

In the preferred embodiment, rhomboidal shaped electrodes of valve metal such as aluminum or tantalum or the like are utilized to provide an electrolytic capacitor. For a non-polar unit, all electrodes are anodized, while in a polar unit unanodized electrodes are alternated with anodized electrodes.

The electrodes are cut from an anodized or unanodized strip of the valve-metal by running the strip through a standard artos type cutter, positioned at an angle to the longitudinal axis of the strip. The electrodes are then suitably stacked in a jig with dielectric material of kraft paper or the like disposed between them. As indicated, every other electrode is rotated 180° with respect to adjacent electrodes.

Once the stack is completed, the spacer is impregnated with an electrolyte, for example, with a conventional glycol borate, and the unit is anodized further by conventional means to heal the cut edges. Finally, the units are completed by crushing together extensions of like polarity, and by connection with leads or the like to these by welding or riveting, or the like.

As shown in the illustration, spacer 16 is not only slightly wider than the electrode but is also longer than the average electrode length such that spacer 16 separates the main body portions of the electrodes and as shown at 18, extends over more than one half the length of the end edges. Hence, this construction provides lateral separation between portions of different polarity at each end of the structure with dielectric insulation interposed between overlying areas of the triangular portions having different polarity.

In this construction, an acute angle is always provided at the most extended point of the electrode ears. Hence, the end edge of the electrode makes an acute angle with its extended longitudinal edge. Of course, this angle may vary considerably, however, larger angles will increase stack capacitance (more overlap between electrodes) but decrease the length and area of the connecting ear, while small acute angles which provide long ear length will cause an excessive reduction in stack capacitance; thus an angle of approximately 45° is preferred.

Figure 3:
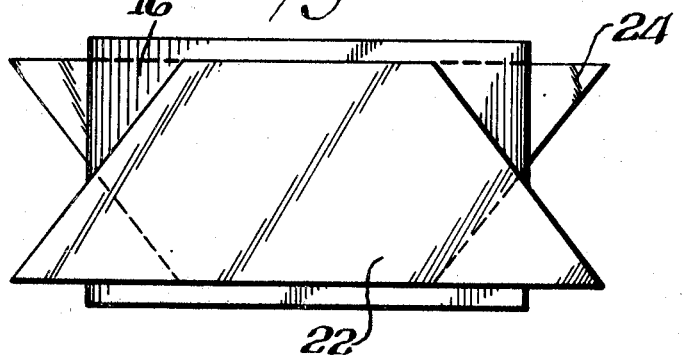
FIG. 3 is a plan view of another embodiment of the invention.

The rhomboidal shaped electrodes are highly advantageous since inexpensive tooling can be economically utilized for shaping of the electrode and, in addition, only simple assembly aids are required for stacking, however, other electrode shapes may be also utilized to provide triangular shaped ears. For example, a trapezoidal electrode as shown in FIG. 3 may be employed. Herein electrodes 22 and 24 are identical trapezoids which are stacked with interposed spacer 16.

In contrast to the rhomboidal electrodes which are non-symmetrical about both axes and are rotated around either, the trapezoidal electrode is symmetrical about the vertical axis. Hence, rotation about this axis will not provide a lateral displacement of the extensions, and thus in this embodiment, alternate electrodes may only be rotated around the longitudinal axis.

In a specific example, a capacitor was constructed with rhombic shaped electrodes of aluminum. A polarized unit was provided by cutting anode electrodes from anodized 3 mil thick etched, high purity aluminum, and cathode electrodes from unanodized 2 mil thick film of the same material.

The electrodes were cut from a 3 inch wide strip with an angle of 55° at the extreme ends of each electrode. This provided an approximate length of 3⅝ inches for the end edge. The side length was made 4 inches.

The unit was assembled with a 3½ inch wide by 4½ inch long spacer of 4 mil thick Manila paper interposed between electrodes and centered with respect to each. Approximately 100 plates were employed, and the assembled unit was saturated with glycol borate. This provided a unit having a capacitance of 100, 900 mf. and and E.S.R. of .00746 ohm as measured with 120 hertz.

Many different embodiments are possible of course. For example, the electrode configurations may be provided with each end portion inclined or slanted at different angles so as to provide different size ears for each polarity, or to provide larger longitudinal extensions at one end of the stack than the other. As in conventional flat pack capacitors, any number of electrodes may be stacked to provide the desired capacitance, and the novel construction is equally applicable to electrostatic as well as electrolytic capacitors.

Thus, many different embodiments are possible, without departing from the spirit and scope of the invention, and it should be understood that the invention is not to be limited except as in the appended claims.

What is claimed is:

1. A flat pack capacitor comprising a plurality of planar electrodes in a stacked arrangement with interposed spacers of dielectric material, each of said electrodes having an end edge slanted at an oblique angle to the longitudinal edges thereof to provide a triangular shaped electrode portion longitudinally extended from a main body portion, and said electrodes stacked with said body portions substantially overlying one another and with alternate electrodes rotated 180° such that triangular portions of different polarity are laterally spaced from each other at an end of the unit.

2. The capacitor of claim 1 wherein both end edges are slanted with respect to said longitudinal edges of said electrode for providing triangular extensions of each electrode at both ends of said unit.

3. The capacitor of claim 2 wherein said dielectric spacer slightly exceeds the average length of said electrodes such that said spacer overlies at least one half the length of said end edges so as to also provide spacer material interposed between overlying areas of triangular portions of different polarity.

4. The capacitor of claim 2 wherein said electrodes are trapezoidal shaped, and alternate electrodes are rotated around their longitudinal axis to provide electrode extensions of similar polarity at corresponding corners of both ends of said unit.

5. The capacitor of claim 2 wherein said electrodes are rhomboidal shaped and alternate electrodes are rotated around either axis to provide electrode extensions of similar polarity at alternate corners of said unit.

References Cited
UNITED STATES PATENTS 2,608,601   8/1952   Boardman _____ 317—261

FOREIGN PATENTS 898,179   6/1941   Germany.
1,038,341   8/1966   Great Britain.

ELLIOT A. GOLDBERG, Primary Examiner

U.S. Cl. X.R.

317—242